US010704424B2

(12) United States Patent
Burd et al.

(10) Patent No.: US 10,704,424 B2
(45) Date of Patent: Jul. 7, 2020

(54) COATED COOLING PASSAGE

(71) Applicant: United Technologies Corporation, Farmington, CT (US)

(72) Inventors: Steven W. Burd, Cheshire, CT (US); Christopher R. Brdar, Rocky Hill, CT (US); Derk S. Philippona, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 469 days.

(21) Appl. No.: 15/029,525

(22) PCT Filed: Sep. 4, 2014

(86) PCT No.: PCT/US2014/054081
§ 371 (c)(1),
(2) Date: Apr. 14, 2016

(87) PCT Pub. No.: WO2015/065587
PCT Pub. Date: May 7, 2015

(65) Prior Publication Data
US 2016/0273391 A1 Sep. 22, 2016

Related U.S. Application Data

(60) Provisional application No. 61/899,552, filed on Nov. 4, 2013.

(51) Int. Cl.
F01D 25/30 (2006.01)
F01D 25/14 (2006.01)
(Continued)

(52) U.S. Cl.
CPC ......... F01D 25/305 (2013.01); F01D 25/145 (2013.01); F01D 25/30 (2013.01);
(Continued)

(58) Field of Classification Search
CPC ...... F01D 25/145; F01D 25/30; F01D 25/305; F02K 1/822; F02K 1/825; F02K 1/827; B21D 28/24–36
See application file for complete search history.

(56) References Cited

U.S. PATENT DOCUMENTS 5,000,005 A * 3/1991 Kwan ................ F01D 5/184
431/352
5,130,163 A 7/1992 Clingman et al.
(Continued)

FOREIGN PATENT DOCUMENTS

FR 2421357 * 3/1978

OTHER PUBLICATIONS

Machine translation of FR2421357.*
EP search report for EP14857449.4 dated Oct. 27, 2016.

Primary Examiner — Igor Kershteyn
Assistant Examiner — Brian O Peters
(74) Attorney, Agent, or Firm — Getz Balich LLC

(57) ABSTRACT

A component for a gas turbine engine includes a substrate with a substrate aperture and a coating on the substrate that extends a length of the substrate aperture. A liner assembly for a gas turbine engine includes a hot sheet with a multiple of apertures and a coating on the hot sheet that extends a length of each of the multiple of apertures. A method of forming an aperture to provide film cooling in a component of a gas turbine engine, includes forming a multiple of substrate apertures in a substrate. Each of the multiple of substrate apertures defines a substrate inner periphery. A coating is applied on the substrate after forming the multiple of substrate apertures to define a coating inner periphery at least partially within each of the multiple of substrate apertures. The coating inner periphery is smaller than the substrate inner periphery.

4 Claims, 4 Drawing Sheets

(51) Int. Cl.
  *F02K 1/82* (2006.01)
  *F02C 7/12* (2006.01)

(52) U.S. Cl.
  CPC ............... *F02C 7/12* (2013.01); *F02K 1/822* (2013.01); *F05D 2220/32* (2013.01); *F05D 2230/10* (2013.01); *F05D 2230/31* (2013.01); *F05D 2230/90* (2013.01); *F05D 2240/15* (2013.01); *F05D 2250/38* (2013.01); *F05D 2260/202* (2013.01); *F05D 2260/231* (2013.01); *Y02T 50/675* (2013.01); *Y02T 50/6765* (2018.05)

(56) References Cited

U.S. PATENT DOCUMENTS

| | | | |
|---|---|---|---|
| 5,265,409 A | 11/1993 | Smith, Jr. et al. | |
| 5,382,133 A | 1/1995 | Moore et al. | |
| 5,771,577 A * | 6/1998 | Gupta | F01D 5/186 29/889.72 |
| 6,183,199 B1 | 2/2001 | Beeck et al. | |
| 6,199,371 B1 * | 3/2001 | Brewer | F01D 25/26 60/766 |
| 6,210,488 B1 * | 4/2001 | Bruce | B08B 3/12 134/1 |
| 6,375,425 B1 * | 4/2002 | Lee | C23C 28/00 416/97 R |
| 6,408,610 B1 * | 6/2002 | Caldwell | C23C 14/046 29/889.2 |
| 6,869,268 B2 | 3/2005 | Liang | |
| 6,918,742 B2 | 7/2005 | Liang | |
| 7,614,235 B2 * | 11/2009 | Burd | F23R 3/002 60/752 |
| 7,622,160 B2 | 11/2009 | Gupta et al. | |
| 7,631,481 B2 * | 12/2009 | Cowan | F02K 1/004 60/266 |
| 7,631,502 B2 | 12/2009 | Burd et al. | |
| 7,816,625 B2 * | 10/2010 | Beck | B23K 26/0608 219/121.71 |
| 7,905,094 B2 | 3/2011 | Dudebout et al. | |
| 8,057,179 B1 | 11/2011 | Liang | |
| 8,057,180 B1 | 11/2011 | Liang | |
| 8,057,181 B1 | 11/2011 | Liang | |
| 8,262,802 B2 | 9/2012 | Garry et al. | |
| 2002/0108375 A1 | 8/2002 | Johnson et al. | |
| 2004/0126237 A1 * | 7/2004 | Jackson | C04B 41/009 416/97 R |
| 2005/0166598 A1 | 8/2005 | Spadaccini et al. | |
| 2005/0271514 A1 | 12/2005 | Lee et al. | |
| 2006/0059918 A1 | 3/2006 | Caldwell et al. | |
| 2006/0086077 A1 | 4/2006 | Skoog et al. | |
| 2006/0179815 A1 * | 8/2006 | Means | F01N 13/082 60/39.5 |
| 2006/0263217 A1 * | 11/2006 | Spanks, Jr. | F01D 5/186 416/97 R |
| 2007/0036942 A1 | 2/2007 | Steele | |
| 2007/0295860 A1 * | 12/2007 | Gustafsson | B64D 33/04 244/73 R |
| 2009/0142548 A1 | 6/2009 | Patterson et al. | |
| 2009/0178383 A1 | 7/2009 | Murphy et al. | |
| 2010/0075111 A1 | 3/2010 | Arrell et al. | |
| 2010/0146980 A1 * | 6/2010 | Strom | F02K 1/825 60/770 |
| 2012/0099978 A1 * | 4/2012 | Beyer | B23P 15/04 415/197 |
| 2012/0189817 A1 | 7/2012 | Rosenzweig et al. | |
| 2013/0014510 A1 | 1/2013 | Pater | |

* cited by examiner

COATED COOLING PASSAGE

CROSS-REFERENCE TO RELATED APPLICATION

This application claims priority to PCT Patent Application No. PCT/US14/054081 filed Sep. 4, 2014, which claims priority to U.S. Patent Application No. 61/899,552 filed Nov. 4, 2013, which are hereby incorporated herein by reference in their entireties.

STATEMENT REGARDING FEDERALLY SPONSORED RESEARCH OR DEVELOPMENT

This disclosure was made with Government support under N00019-02-C-3003 awarded by the United States Air Force. The Government may have certain rights in this disclosure.

BACKGROUND

The present disclosure relates to gas turbine engines, and more particularly to an exhaust duct therefor.

Gas turbine engines, such as those which power modern military and commercial aircraft, include a compressor section to pressurize a supply of air, a combustor section to burn a hydrocarbon fuel in the presence of the pressurized air, and a turbine section to extract energy from the resultant combustion gases and generate thrust. Downstream of the turbine section, military aircraft engines often include an augmentor section, or "afterburner", operable to selectively increase thrust. The increase in thrust is produced when fuel is injected into the core exhaust gases downstream of the turbine section and burned with the oxygen contained therein to generate a second combustion.

The augmentor section and downstream exhaust duct and nozzle sections may be exposed to high temperature exhaust gases such that a liner assembly is disposed between the exhaust gas and the exhaust duct to provide thermal protection and/or acoustic damping. These may be of single or double walled construction, with a hot sheet and a cold sheet. The hot sheet may have a thermal barrier or radar signature reduction coating. The exhaust gas temperatures may in some instances exceed the metallic alloy capabilities in these sections such that film cooling is provided therefor. The cooling air is provided though numerous cooling holes to sheath the hardware from the exhaust gases. The cooling holes are typically produced via a laser drill through the coated substrate.

SUMMARY

A component for a gas turbine engine, according to one disclosed non-limiting embodiment of the present disclosure, includes a substrate with a substrate aperture and a coating on the substrate that extends a length of the substrate aperture.

In a further embodiment of the present disclosure, the coating is thicker than a thickness of the substrate.

In a further embodiment of any of the foregoing embodiments of the present disclosure, a thickness of the coating is between 10%-100% of a characteristic diameter of the substrate aperture.

In a further embodiment of any of the foregoing embodiments of the present disclosure, the coating is a thermal barrier coating.

In a further embodiment of any of the foregoing embodiments of the present disclosure, the coating is a signature reduction coating.

In a further embodiment of any of the foregoing embodiments of the present disclosure, the coating is about between 0.010-0.1 inches (0.254-2.54 mm) thick.

In a further embodiment of any of the foregoing embodiments of the present disclosure, the substrate aperture defines a raised area toward a backside of the substrate.

In a further embodiment of any of the foregoing embodiments of the present disclosure, the coating defines a coating inner periphery at least partially within a substrate inner periphery. The coating inner periphery is smaller than the substrate inner periphery.

In a further embodiment of any of the foregoing embodiments of the present disclosure, the coating inner periphery defines an angle with respect to an axis of the substrate aperture.

A liner assembly for a gas turbine engine, according to another disclosed non-limiting embodiment of the present disclosure, includes a hot sheet with a multiple of apertures and a coating on the hot sheet that extends a length of each of the multiple of apertures.

In a further embodiment of any of the foregoing embodiments of the present disclosure, a cold sheet is included and spaced from the hot sheet. The cold sheet and the hot sheet are within an exhaust duct of a gas turbine engine.

In a further embodiment of any of the foregoing embodiments of the present disclosure, the coating defines a coating inner periphery at least partially within a substrate inner periphery of each of the multiple of apertures. The coating inner periphery is smaller than the substrate inner periphery.

In a further embodiment of any of the foregoing embodiments of the present disclosure, the coating inner periphery defines an angle with respect to an axis of the substrate aperture.

In a further embodiment of any of the foregoing embodiments of the present disclosure, the coating defines an unequal thickness within the substrate inner periphery.

A method of forming an aperture to provide film cooling in a component of a gas turbine engine, according to another disclosed non-limiting embodiment of the present disclosure, includes forming a multiple of substrate apertures in a substrate and applying a coating on the substrate after forming the multiple of substrate apertures to define a coating inner periphery at least partially within each of the multiple of substrate apertures.

In a further embodiment of any of the foregoing embodiments of the present disclosure, the method includes applying the coating at a non-perpendicular angle to the substrate.

In a further embodiment of any of the foregoing embodiments of the present disclosure, the method includes punching the multiple of substrate apertures in the substrate from a front side to form a raised region on a backside of the substrate.

In a further embodiment of any of the foregoing embodiments of the present disclosure, the method includes laser drilling the multiple of substrate apertures in the substrate.

In a further embodiment of any of the foregoing embodiments of the present disclosure, the coating inner periphery defines an angle with respect to an axis of the substrate aperture.

In a further embodiment of any of the foregoing embodiments of the present disclosure, the coating defines an unequal thickness around the substrate inner periphery.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
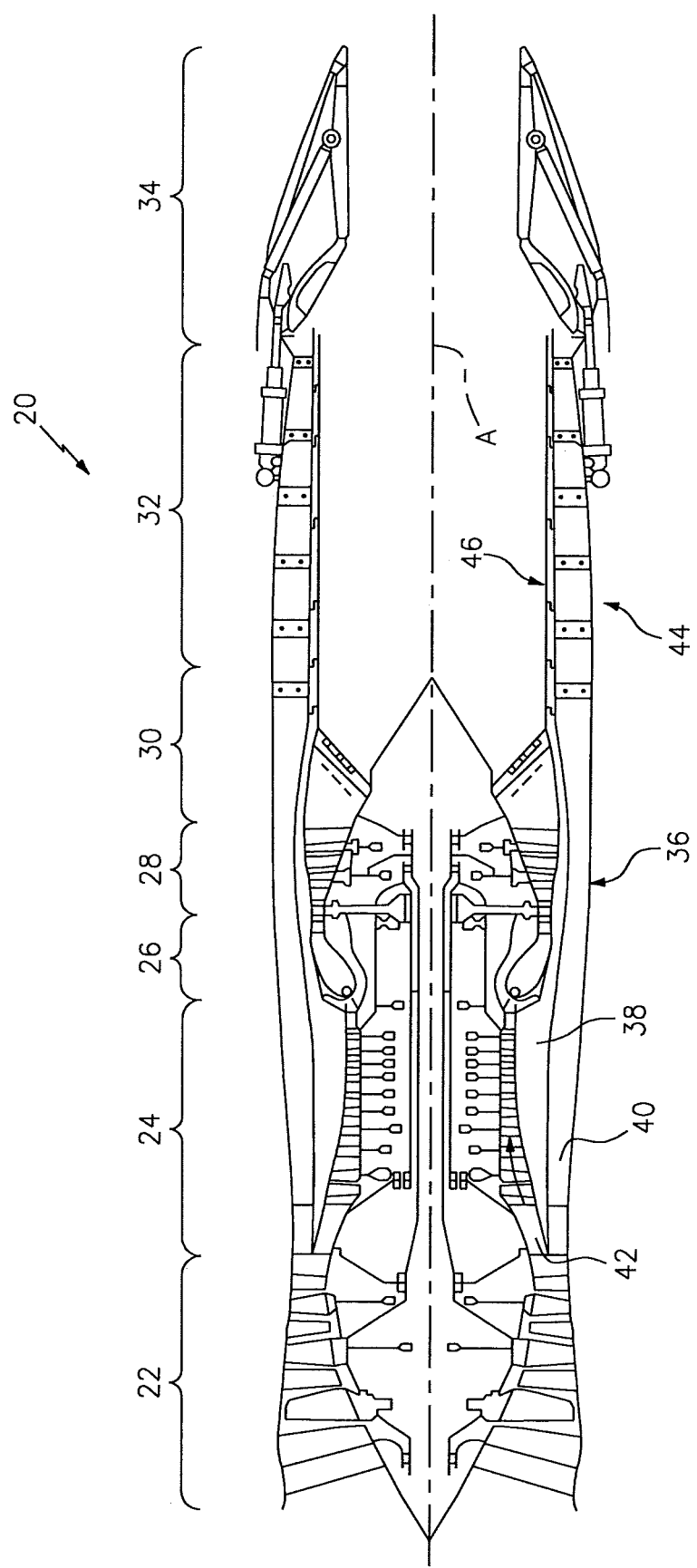
FIG. 1 is a general schematic view of an exemplary gas turbine engine for use with the present disclosure.

FIG. 1 schematically illustrates a gas turbine engine 20. The gas turbine engine 20 is disclosed herein as a two-spool low-bypass augmented turbofan that generally incorporates a fan section 22, a compressor section 24, a combustor section 26, a turbine section 28, an augmenter section 30, an exhaust duct section 32, and a nozzle section 34 along a central longitudinal engine axis A. Although depicted as an augmented low bypass turbofan in the disclosed non-limiting embodiment, it should be understood that the concepts described herein are applicable to other gas turbine engines, including, for example, non-augmented engines, geared architecture engines, direct drive turbofans, turbojet, turboshaft, multi-stream variable cycle, ramjet and other engine architectures as well as within other engine sections such as the combustor section 26.

An outer structure 36 and an inner structure 38 define a generally annular secondary airflow path 40 around a core primary airflow path 42. Various structure and modules may define the outer structure 36 and the inner structure 38 which essentially define an exoskeleton to support the rotational hardware therein.

Air that enters the fan section 22 is divided between a primary airflow through the primary airflow path 42 and a secondary airflow through the secondary airflow path 40. The primary airflow passes through the combustor section 26, the turbine section 28, then the augmentor section 30 where fuel may be selectively injected and burned to generate additional thrust through the nozzle section 34. It should be appreciated that additional airflow streams such as third stream airflow typical of variable cycle engine architectures may additionally be sourced from the fan section 22.

The secondary airflow may be utilized for a multiple of purposes to include, for example, cooling and pressurization. The secondary airflow as defined herein is any airflow different from the primary airflow. The secondary airflow may ultimately be at least partially injected into the primary airflow path 42 adjacent to the exhaust duct section 32 and the nozzle section 34.

Figure 2:
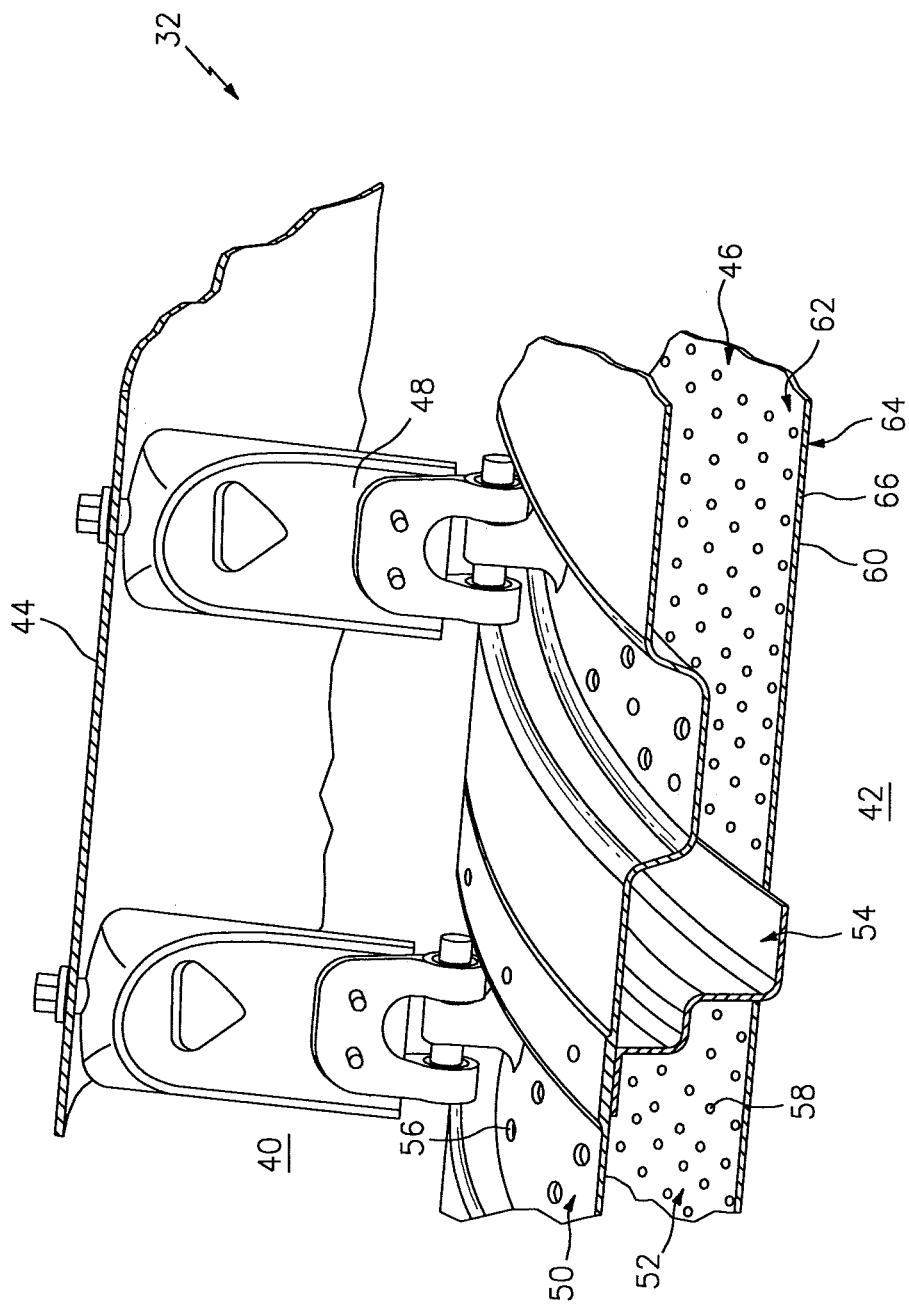
FIG. 2 is a perspective cross section of an exhaust duct section according to one non-limiting embodiment.

With reference to FIG. 2, the exhaust duct section 32 generally includes an outer exhaust duct case 44 (illustrated schematically) of the outer structure 36 and a liner assembly 46 spaced inward therefrom. The exhaust duct section 32 may be circular in cross-section as typical of an axis-symmetric augmented low bypass turbofan, non-axisymmetric in cross-section, as well as other shapes to include, but not be limited to, an oval cross-section, a rectilinear cross-section or combinations thereof. In addition to the various cross-sections, the exhaust duct section 32 may be non-linear with respect to the central longitudinal engine axis A to form, for example, a serpentine shape to block direct view to the turbine section 28. Furthermore, in addition to the various cross-sections and the various longitudinal shapes, the exhaust duct section 32 may terminate in the nozzle section 34 (see FIG. 1) which may be a convergent divergent nozzle, a non-axisymmetric two-dimensional (2D) vectorable nozzle section, a flattened slot convergent nozzle of high aspect ratio or other exhaust duct arrangement.

The liner assembly 46 operates as a heat shield to protect the outer exhaust duct case 44 from the high temperature exhaust gases in the primary airflow path 42 downstream of the turbine section 28. Secondary air discharged from, for example, the fan section 22 or compressor section 24, is communicated through an annular passageway 48 defined between the outer exhaust duct case 44 and the inner liner assembly 46. Since the secondary air is relatively cool compared to the exhaust gases in the primary airflow path 42, the secondary air cools the liner assembly 46 to enhance the life and reliability thereof.

The liner assembly 46 may include a cold sheet 50 separated from a hot sheet 52 by a plurality of structural supports 54 which attach the cold sheet 50 to the hot sheet 52. During engine operation, the cold sheet 50 receives relatively large pressure loads and deflections, while the hot sheet 52 receives relatively small pressure loads and deflections and thereby better retains ceramic coatings. It should be appreciated that various types of structural supports as well as locations therefore may be used herewith and that the illustrated structural supports 54 is but one non-limiting examples.

The cold sheet 50 may be corrugated with various rippled or non-planar surfaces and include a multiple of metering passages 56 to receive secondary airflow from between the outer exhaust duct case 44 and the liner assembly 46. The secondary airflow is communicated through passages 58 in the hot sheet 52. The passages 58 provide film cooling and are generally more prevalent than the metering passages 56 which provide impingement cooling to the hot sheet 52. The secondary airflow thereby provides impingement and film cooling to sheath the liner assembly 46 from the relatively high temperature combustion products. In another disclosed non-limiting embodiment, the passages 58 may provide acoustic dampening.

The hot sheet 52 includes a backside 62 that faces the cold sheet 50 and a front side 64 opposite the backside 62 on the exhaust gas path side of the hot sheet 52. The front side 64 is that which is directly in contact with the relatively high temperature exhaust gases, which in this disclosed non-limiting embodiment, may be generated by secondary combustion in the augmenter section 30 (see FIG. 1).

As further discussed below with respect to FIGS. 3-4, the front side 64 includes a coating 60 such as a thermal barrier or radar signature reduction coating. Although the hot sheet 52 is illustrated herein as representative of a substrate 66 with the coating 60, it should be appreciated that various coated components that, for example, provide environmental protection, heat resistance, signature reduction and/or acoustic damping will also benefit herefrom. In one example, the substrate 66 is about equal in thickness to the coating 60 and may be between about 0.010-0.1 inches (0.254-2.54 mm). More specifically, the coating 60 may be between 20%-200% the thickness of the substrate 66 applied to the front side 64.

Figure 3:
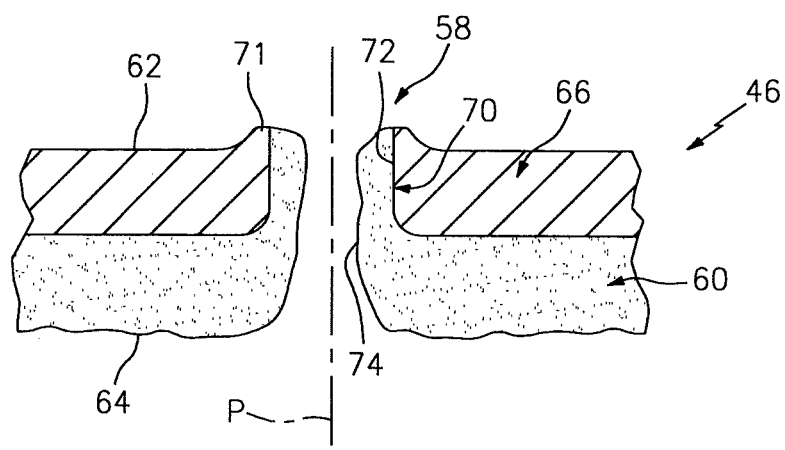
FIG. 3 is a cross section through a passage according to one non-limiting embodiment.

With reference to FIG. 3, each passage 58 in this disclosed non-limiting embodiment includes a substrate aperture 70 formed in the substrate 66 through, for example, cutting, punching, drilling, laser drilling or other formation technique. In one disclosed non-limiting embodiment, the substrate includes a raised region 71 on the backside 62 thereof as the passage 58 is formed from the front side 64. The raised region 71 is a generally protruding area on the backside 62 and may at least partially surround the periphery of the passage 58 as typical of a punch form operation. It should be appreciated that other forming techniques such as laser drilling may not result in a raised area or upset typical of punching through the material.

The coating 60 is applied to the substrate 66 and at least partially into the substrate aperture 70 to at least partially reduce a substrate inner periphery 72, e.g., characteristic diameter of the substrate aperture 70 along the passage 58 and form a desired coating inner periphery 74 smaller than the substrate inner periphery 72. That is, as the coating 60 is applied onto the front side 64 of the substrate 66, the coating 60 will at least partially accumulate within the substrate aperture 70 to form the substrate inner periphery 72. In one disclosed non-limiting embodiment, the coating 60 may be of a thickness that is between 10%-100% the characteristic diameter of the aperture 70. "Characteristic diameter" as defined herein is applicable to circular and non-circular apertures such as an oval or racetrack shaped aperture 70. That is, the aperture 70 includes, but is not limited to, a circular cross section.

In one disclosed non-limiting embodiment, the coating 60 is applied generally normal to the substrate 66 such that the substrate inner periphery 72 and the coating inner periphery 74 are generally coaxial along a passage axis P of each passage 58.

Figure 4:
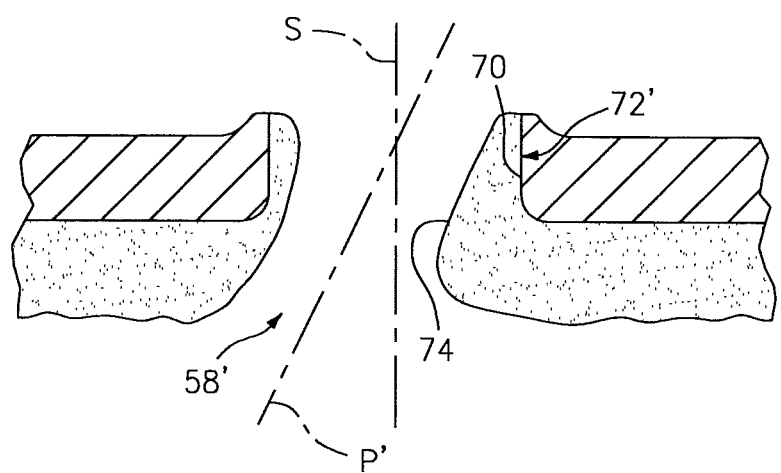
FIG. 4 is a cross section through a passage according to another non-limiting embodiment.

With reference to FIG. 4, in another disclosed non-limiting embodiment, the coating 60 is applied at an angle to the substrate 66 such that the substrate inner periphery 74' is defined along a passage axis P' that is angled with respect to an axis S of the substrate aperture 70. That is, the coating 60 builds-up unequally around the substrate inner periphery 72 to form an unequal thickness around the substrate inner periphery 72. The resultant coating inner periphery 74' thereby defines a passage 58' oriented generally transverse to the substrate aperture 70.

Figure 5:
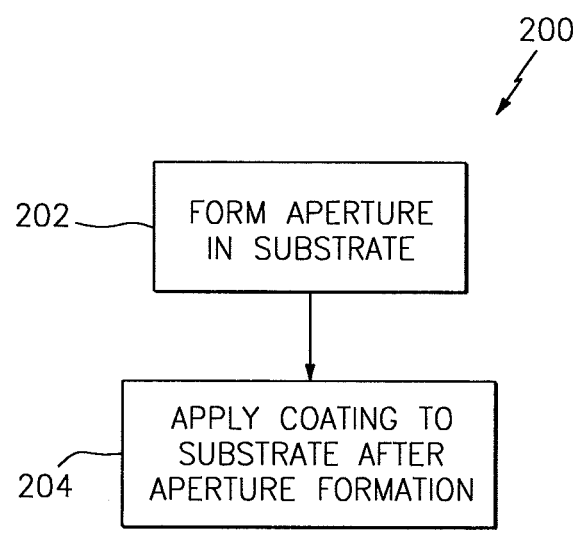
FIG. 5 is a flow chart of a coating application process.

With reference to FIG. 5, a flow chart illustrates one disclosed non-limiting embodiment of a method 200 for fabricating the passage 58. The method 200 initially includes forming the substrate aperture 70 in the substrate 66 (step 202). The substrate aperture 70 may be, for example, drilled, cut, punched or otherwise formed through the substrate 66. Further, the substrate aperture 70 may be "oversize" to accommodate the reduced periphery formed by the coating 60.

Next, the coating 60 is applied to the front side 64 of the substrate 66 and into the substrate aperture 70 (step 204). The coating 60 may be applied normal to the substrate 66 or at an angle thereto to form coaxial passage 58 (see FIG. 3) or angled passages 58 (see FIG. 4). The coating 60 may be applied via, for example, an air-plasma spray that partially passes through the substrate aperture 70 to at least partially reduce the substrate inner periphery 72 of the substrate aperture 70 to form the desired coating inner periphery 74 smaller than the substrate inner periphery 72.

As application of the coating 60 forms the passage 58, manufacture thereof is relatively efficient, and facilitates repair and remanufacture.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A liner assembly for a gas turbine engine, the liner assembly comprising:
    a hot sheet configured with a multiple of apertures that extend through the hot sheet between opposing surfaces of the hot sheet; and
    a coating on the hot sheet that extends a length of each of the multiple of apertures such that the coating completely defines a multiple of passages completely through the hot sheet, wherein each of the passages is associated with a respective one of the apertures;
    wherein a passage axis of a first of the passages is angularly offset from an aperture axis of a first of the apertures by an acute angle, the first of the passages is associated with the first of the apertures, and the aperture axis is perpendicular to at least one of the opposing surfaces of the hot sheet.

2. The liner assembly as recited in claim 1, further comprising a cold sheet spaced from the hot sheet, wherein the cold sheet and the hot sheet are within an exhaust duct of a gas turbine engine.

3. The liner assembly as recited in claim 1, wherein the coating defines a coating inner periphery at least partially within a substrate inner periphery of each of the multiple of apertures, and the coating inner periphery is smaller than the substrate inner periphery.

4. The liner assembly as recited in claim 3, wherein the coating defines an unequal thickness within the substrate inner periphery.

* * * * *